United States Patent
Tomida (10) Patent No.: US 8,820,374 B2
(45) Date of Patent: Sep. 2, 2014

(54) TIRE

(75) Inventor: Tatsuya Tomida, Kokubunji (JP)

(73) Assignee: Bridgestone Corporation, Tokyo (JP)

( * ) Notice: Subject to any disclaimer, the term of this patent is extended or adjusted under 35 U.S.C. 154(b) by 624 days.

(21) Appl. No.: 13/125,215

(22) PCT Filed: Oct. 21, 2009

(86) PCT No.: PCT/JP2009/068142
§ 371 (c)(1),
(2), (4) Date: Jun. 17, 2011

(87) PCT Pub. No.: WO2010/047353
PCT Pub. Date: Apr. 29, 2010

(65) Prior Publication Data
US 2011/0247739 A1 Oct. 13, 2011

(30) Foreign Application Priority Data
Oct. 21, 2008 (JP) .................. 2008-271133

(51) Int. Cl.
*B60C 11/13* (2006.01)
*B60C 11/11* (2006.01)

(52) U.S. Cl.
USPC ............ 152/209.18; 152/209.16; 152/209.24; 152/902; 152/903

(58) Field of Classification Search
CPC ............ B60C 11/0304; B60C 11/0306; B60C 11/0309; B60C 11/0307; B60C 11/1315; B60C 11/1323; B60C 2011/0372; B60C 2011/0381; B60C 2011/0358; B60C 2011/0374

USPC .............. 152/209.1, 209.8, 209.16, 209.18, 152/209.24, 209.27, 902, 903; D12/525–532, 557–567, 592–603, 900
See application file for complete search history.

(56) References Cited

U.S. PATENT DOCUMENTS

| 4,832,099 A | 5/1989 | Matsumoto |
| 5,885,384 A | 3/1999 | Himuro |

(Continued)

FOREIGN PATENT DOCUMENTS

| CN | 1338996 A | 3/2002 |
| EP | 1097826 A1 | 5/2001 |

(Continued)

OTHER PUBLICATIONS

European Search Report issued in Corresponding European Patent Application No. 09 82 2050, dated Aug. 22, 2012.

(Continued)

*Primary Examiner* — Eric Hug
(74) *Attorney, Agent, or Firm* — Sughrue Mion, PLLC (57) ABSTRACT

A tire, wherein, a lateral groove (7) is disposed between a predetermined land block (5) and a land block (6) adjacent to the land block (5) in the tire circumference direction, among land blocks (4, 5, 6), and is formed of an inner lateral groove (Q) and an outer lateral groove (P), the inside lateral groove (Q) being disposed at an inside of a boundary of a bent portion (12) in a tire width direction, the outside lateral groove (P) being disposed at an outside of the bent portion (12), the bent portion (12) being formed at intermediate portion in the tire width direction. The angle θ1 of the inner lateral groove (Q) relative to the tire circumference direction is smaller than the angle θ2 of the outer lateral groove (P) relative to the circumference direction.

8 Claims, 7 Drawing Sheets

(56) References Cited

U.S. PATENT DOCUMENTS

| | | |
|---|---|---|
| 5,960,845 A | 10/1999 | Wada |
| 2002/0134477 A1 | 9/2002 | Cantu' et al. |
| 2010/0294409 A1* | 11/2010 | Bolzoni et al. ........... 152/209.18 |

FOREIGN PATENT DOCUMENTS

| EP | 1 674 293 A2 | 6/2006 |
|---|---|---|
| JP | 8-85310 A | 4/1996 |
| JP | 9-328003 A | 12/1997 |
| JP | 10-226207 A | 8/1998 |
| JP | 2000-94907 A | 4/2000 |
| JP | 2003-515485 A | 5/2003 |
| JP | 2005-153813 A | 6/2005 |
| JP | 2006-151173 A | 6/2006 |
| WO | 01/39995 A1 | 6/2001 |

OTHER PUBLICATIONS

International Search Report for PCT/JP2009/068142, dated Jan. 26, 2010.

Chinese Office Action, dated Dec. 31, 2012, issued in corresponding Chinese Application No. 200980141981.9.

European Official Action, dated Mar. 4, 2014, issued in counterpart European Patent Application No. 09822050.2.

* cited by examiner

ROTATION DIRECTION ←

TIRE

CROSS REFERENCE TO RELATED APPLICATION

This application is a National Stage of International Application No. PCT/JP2009/068142 filed Oct. 21, 2009, claiming priority based on Japanese Patent Application No. 2008-271133, filed Oct. 21, 2008, the contents of all of which are incorporated herein by reference in their entirety.

TECHNICAL FIELD

The present invention relates to a tire, and in further detail, to a tire which is capable of effectively restraining a heel and toe frictional wear at a shoulder portion, in particular.

BACKGROUND ART

In general, in a vehicle tire, a plurality of circumferential grooves are provided to thereby ensure drainage property of rainwater or the like at the time of running a road surface, and lateral grooves which extend in a tire width direction are provided to thereby ensure high steering property. In addition, a plurality of land blocks are defined by these circumferential grooves and lateral grooves.

In these land part blocks, at the time of tire rotation, one end part in a tire circumferential direction is present at a stepping side, and the other end part is present at a kicking-out side, the land blocks are deformed by being subjected to a resistive force from a road surface at the stepping in site; and thereafter, a ground region moves from the stepping side to the kicking-out side and then is spaced from the road surface at an end part of the kicking-out side. Subsequently, the land blocks are restored to their original shape instantaneously when it is spaced from the road surface, and at the pick-out side, the road surface is frictionally worn while being subjected to a great grounding pressure; and therefore, there occurs a so called heel and toe frictional wear that, while a vehicle runs for a long period of time, the kicking-out side is frictionally worn more greatly than at the stepping side and a step difference arises at the land block.

Here, in general, the heel and toe frictional wear significantly occurs at a site at the outside in a tire width direction of the land blocks at a shoulder portion; and therefore, conventionally, countermeasures against frictional wear of the site at the outside in the tire width direction have been mainly taken. As one of these countermeasures against frictional wear, there is a method of tilting a lateral groove angle in the tire width direction side relative to a tire circumferential direction and then restraining torsional deformation when the land blocks are grounded on a road surface. In addition, there is also known the art of forming a sipe which extends along the width direction in the land blocks and then lowering rigidity of the land blocks to thereby restrain the heel and toe frictional wear (for example, see Patent Document 1).

PRIOR ART DOCUMENT

Patent Document

Patent Document: Japanese Patent Application Laid-open No. 10-226207 (page 3, FIG. 1 and FIG. 2)

SUMMARY OF THE INVENTION

However, in the conventional tire described previously, while frictional wear relative to the outside in the tire width direction in the land blocks of the shoulder portion is improved, there has been apprehension that it becomes difficult to sufficiently improve the heal and toe frictional wear at the inside in the tire width direction.

Therefore, the present invention has been made in view of such a circumstance, and an object of the present invention is to provide a tire which is capable of effectively restraining heel and toe frictional wears at both portions of the land blocks of the shoulder portion at the outside in the tire width direction and at the inside of the tire width direction. In order to solve the aforementioned problem, the present invention has the following features.

Firstly, in a first feature of the present invention, a tire has a plurality of land blocks (land blocks 4, 5, 6) formed by a circumferential groove (circumferential groove) extending in a tire circumferential direction and a lateral groove (inter-block lateral groove 7) extending in a tire width direction, and formed on at least one of a tread portion and a shoulder portion. An inter-block lateral groove (inter-block lateral groove 7) is disposed between a predetermined land block (land blocks 5) and an adjacent land block (land blocks 6) which is adjacent to the predetermined land block at a tire circumferential direction side of the predetermined land block, among the plurality of the land blocks, and is formed of an inside lateral groove (inside lateral groove Q) and an outside lateral groove (outside lateral groove P), the inside lateral groove being disposed at an inside of a boundary of a bent portion in a tire width direction, the outside lateral groove being disposed at an outside of the bent portion, the bent portion (bent portion 12) being formed at intermediate portion in the tire width direction. An inside lateral groove angle θ1 relative to the tire circumferential direction of the inside lateral groove is smaller than an outside lateral groove angle θ2 relative to the tire circumferential direction of the outside lateral groove.

As to the heel and toe frictional wear at a portion of the land block of the shoulder portion at the outside in the tire width direction, a main factor is a torsion when a land block is grounded or a shear force in the tire width direction increased by roll-up toward the inside in the width direction received from a tire side portion. As to the heel and toe frictional wear at a inside portion in the tire width direction, a main factor becomes apparent that the shear force in the tire circumferential direction increased when a widthwise wall extending in the tire width direction, among the wells defining an outer circumference of a land block, falls backward relative to the tire rotation direction.

Therefore, the inside lateral groove angle θ1 relative to the tire circumferential direction of the inside lateral groove, among the lateral grooves defining the widthwise walls of the land blocks, is set to be smaller than the outside lateral groove angle θ2 relative to the tire circumferential direction of the outside lateral groove, whereby shear deformation which may be one of the main factors for heel and toe frictional wear can be restrained irrespective of where the land blocks are positioned.

In the other features, the inside lateral groove angle θ1 is 30 degrees to 60 degrees and the outside lateral groove angle θ2 is 70 degrees to 90 degrees.

In the other features, the inside lateral groove and the outside lateral groove are formed smoothly and continuously along the tire width direction.

In the other features, a ratio Wx/W between a distance Wx and a total width W is 0.3 to 0.6, the distance Wx being a distance in the tire width direction from a tire width direction inside end of the land block to a cross point x where an extension line of the inside lateral groove crosses an extension line of the outside lateral groove, the total width W in the tire width direction of the laud block.

In the other features, an inside longitudinal wall defining the inside lateral groove of the inter-block lateral groove is included in a longitudinal wall forming a tire circumferential end at a kicking-out side in the land block, and the inside longitudinal wall tilts toward a rotation direction side of the tire, as the inside longitudinal wall becomes inside in a tire radial direction from a tread surface. In the other features, a longitudinal wall forming a tire circumferential end at a kicking-out side in the land block entirely tilts toward a rotation direction side of the tire, as the inside longitudinal wall becomes inside in a tire radial direction from a tread surface.

In the other features, a circumferential thin groove extending in the tire circumferential direction is formed at an inside portion of the land block in the tire width direction.

In the other features, a widthwise thin groove extending in the tire width direction is formed at an outside portion of the land block in the tire width direction.

In the other features, the inter-block lateral groove is formed at the shoulder portion.

In the other features, an angle θ3 formed by the extension line of the inside lateral groove and the extension line of the outside lateral groove is an obtuse angle.

According to the present invention, provide is a tire which is capable of effectively restraining heel and toe frictional wears at both portions of the land blocks of the shoulder portion at the outside in the tire width direction and at the inside of the tire width direction.

MODES FOR CARRYING OUT THE INVENTION

Next, an embodiment of a pneumatic air-containing tire according to the present invention will be described with reference to the drawings. In the following description of the drawings, the same or like constituent elements are designated by the same or like reference numerals. However, it should be kept in mind that the drawings are merely provided as schematic ones, and that each of the ratios of dimensions or the like is different from actual ones.

Therefore, specific dimensions or the like should be determined in consideration of the following description. In addition, it is a matter of course that, among the drawings as well, portions of which interrelationships of dimensions or ratios are different from each other are included.

First Embodiment

First, a first embodiment according to the present invention will be described.

Figure 1:
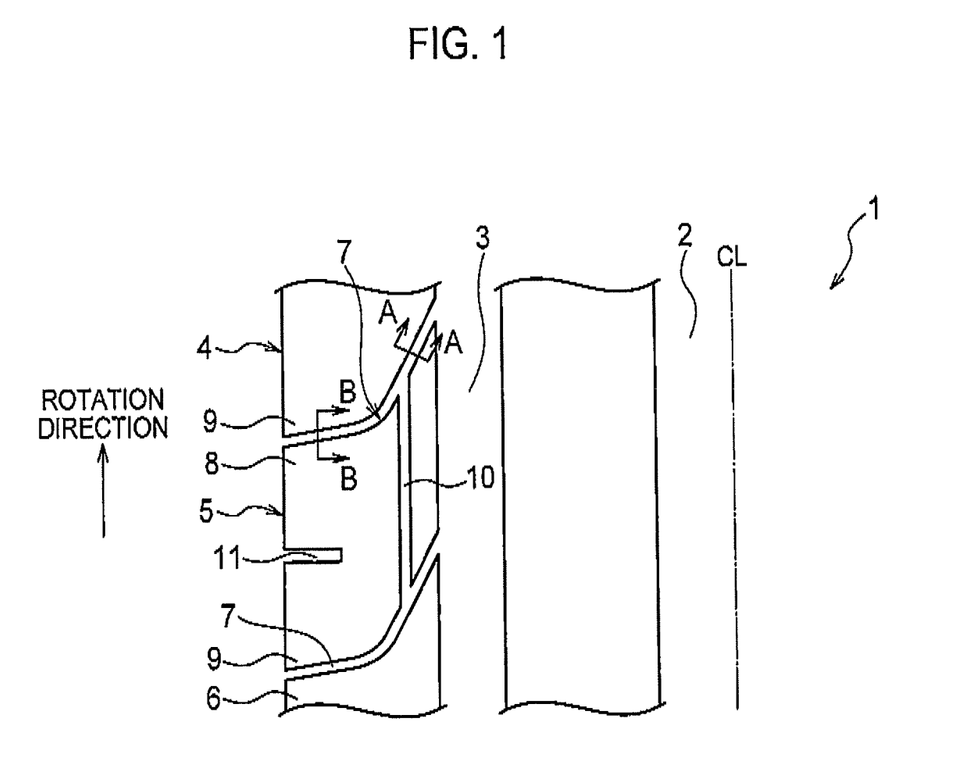
FIG. 1 is an exploded view showing a tread pattern of a pneumatic air-containing tire according to a first embodiment of the present invention.

FIG. 1 is an exploded view showing a tread pattern 1 of a pneumatic air-containing tire according to a first embodiment of the present invention, wherein a rotation direction of the tire is indicated by the arrow. This tread pattern 1 is formed laterally symmetrically relative to a tire widthwise center (tire equator line) CL of a tread portion. In addition, FIG. 2 is an enlarged exploded view of essential parts of FIG. 1.

As shown in FIG. 1, at the tread portion, a plurality of circumferential grooves 2, 3 (three in the embodiment) are formed along a tire circumferential direction. These circumferential grooves 2, 3 are made of: a central circumferential groove 2 which is disposed at a center in the tire width direction; and outside circumferential grooves 3, 3 which are disposed at both sides in the tire width direction. At the outside in the tire width direction of this outside circumferential groove 3, land blocks 4, 5, 6 which are arranged along the tire width direction are formed in plurality. Specifically, the land blocks 4, 5, 6 are formed at a shoulder portion. Between the land block 4 and an adjacent land block 5 which is adjacent in the tire circumferential direction relative to the predetermined land block 4, an inter-block lateral groove 7 which extends in the tire width direction is formed. That is, the inter-block lateral groove 7 is formed only at the shoulder portion. Among the tire circumferential end parts of the land block, an end part at the rotation direction side of the tire serves as a so called stepping side 8 and an opposite end part to the rotation direction of the tire serves as a so called kicking-out side 9.

In addition, a circumferential thin groove 10 which extends in the tire circumferential direction is provided at a site at the inside in the tire width direction in the land block 5. The circumferential thin grooves 10, in the embodiment, cause the adjacent inter-block lateral grooves 7, 7 that are adjacent to each other in the circumferential direction, to be linked with each other in the tire circumferential direction. In addition, a widthwise thin grooves 11 which extends in the tire width direction is formed at a site at the outside in the tire width direction in the land block 5, and an end part at the outside of a vehicle in the widthwise thin groove 11 opens.

Figure 2:
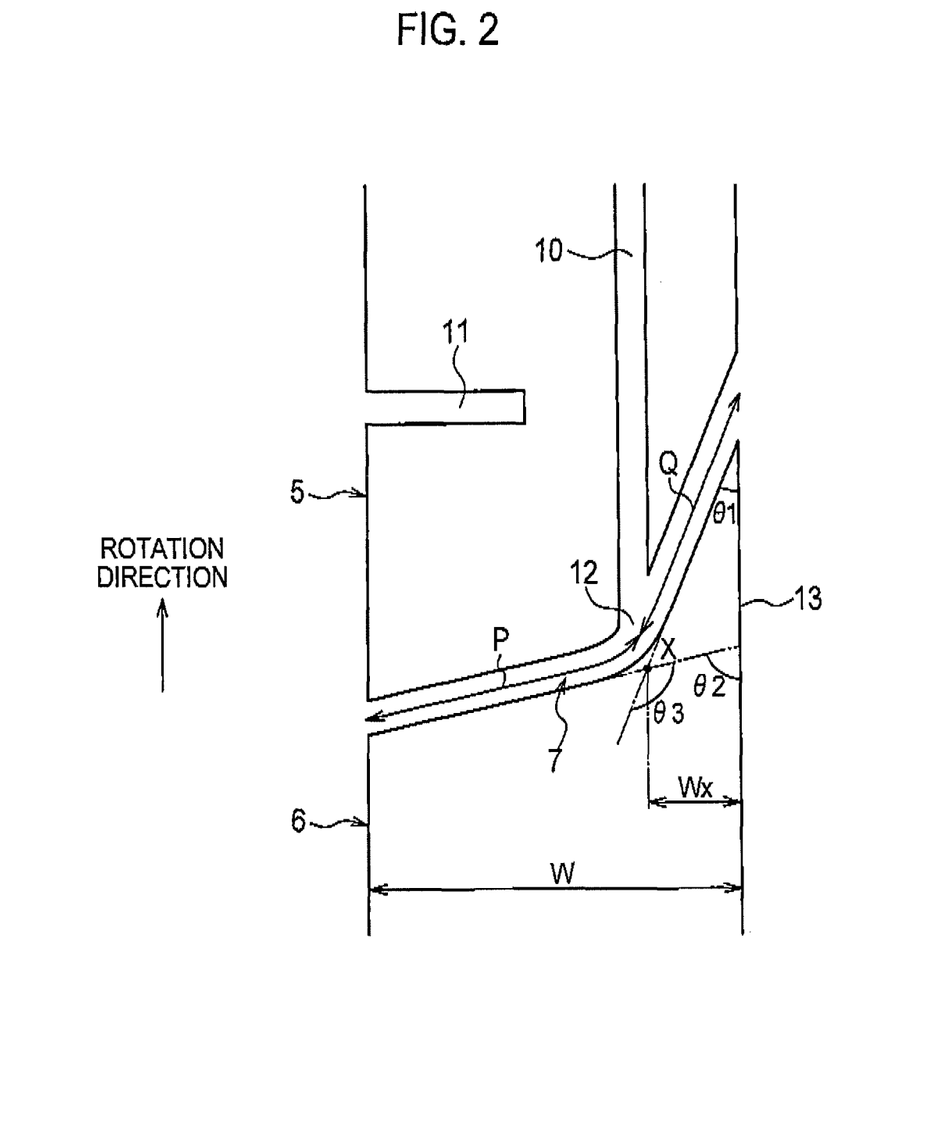
FIG. 2 is an enlarged exploded view of essential parts of FIG. 1.

As shown in FIG. 2, the inter-block lateral groove 7 is formed to be bent in an inverted. V-letter shape in a plan view on a boundary of a bent portion 12 which is disposed intermediate portion in the tire width direction. The outside of the bent portion 12 in the tire width direction is an outside lateral groove P, and the inside of the bent portion 12 in the tire width direction is an inside lateral groove Q.

An inside lateral groove angle, which is an angle formed between an extension direction of the inside lateral groove Q and a tire circumferential direction, is set at θ1, and the outside lateral groove angle, which is an angle formed between an extension direction of the outside lateral groove P and the tire circumferential direction, is set at θ2. This angle θ1 is set at a value which is smaller than the angle θ2. Specifically, the inside lateral groove angle θ1 is 30 degrees to 60 degrees, and the outside lateral groove angle θ2 is 70 degrees to 90 degrees. Further, it is preferable that the inside lateral groove angle θ1 is 40 degrees to 50 degrees, and it is preferable that the outside lateral groove angle θ2 is 80 degrees to 90 degrees.

The inside lateral groove Q and the outside lateral groove P are formed smoothly and continuously along the tire width direction. An angle θ3, which is formed by an extension line of the inside lateral groove Q and an extension line of the outside lateral groove P, is an obtuse angle.

Further, as is evident from FIG. 2, a distance in the tire width direction from a tire widthwise inside end 13 of a land block 6 to a cross point x where the extension line of the inside lateral groove Q crosses the extension line of the outside lateral groove P is set at Wx. On the other hand, a total width in the tire width direction of the land block 6 is set at W, and a ratio Wx/W relative to W of Wx is set at 0.3 to 0.6. It is further preferable that this ratio Wx/W is 0.4 to 0.6.

Figure 3:
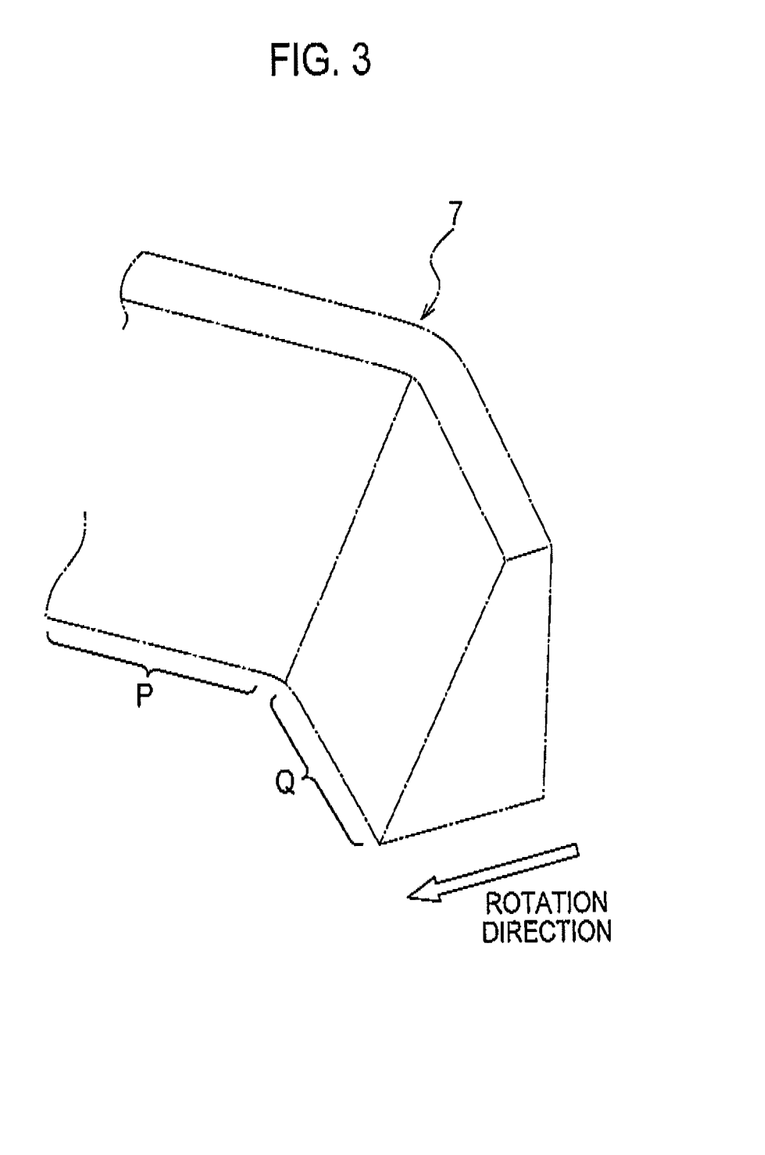
FIG. 3 is a perspective view virtually showing an inter-block lateral groove according to the first embodiment of the present invention.
Figure 4:
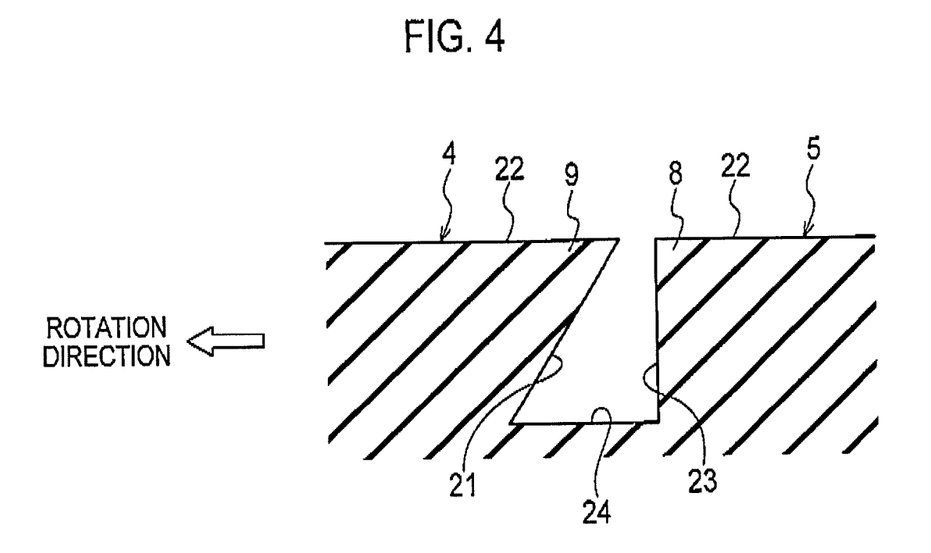
FIG. 4 is an enlarged sectional view taken along the line A-A of FIG. 1.

FIG. 3 is a perspective view virtually showing an inter-block lateral groove according to the first embodiment of the present invention, and FIG. 4 is an enlarged sectional view taken along the line A-A of FIG. 1.

Among longitudinal walls which form a tire circumferential end of the kicking-out side 9 in the land block 4, an inside longitudinal wall 21 which defines the inside lateral groove Q of the inter-block lateral groove 7 tilts towards the rotation direction side of the tire as it goes from a road surface 22 to the inside M the tire radial direction.

That is, as shown in FIG. 3 and FIG. 4, the inside lateral groove Q, in its shape, tilts towards the rotation direction side of the as it goes from the tread surface 22 to the inside in the tire radial direction (in the downward direction of FIGS. 3 and 4). In this manner, the inside lateral groove is formed in a sectional trapezoidal shape of: an inside longitudinal wall 21 which forms the tire circumferential end of the kicking-out side 9; the inside longitudinal wall 23 which forms the tire circumferential end of the stepping side 8; and a bottom wall 24. However, the inside longitudinal wall 23 which forms the tire circumferential end of the stepping side 8 in the land block 5 is disposed substantially vertically from the tread surface 22 towards the inside in the tire radial direction.

Figure 5:
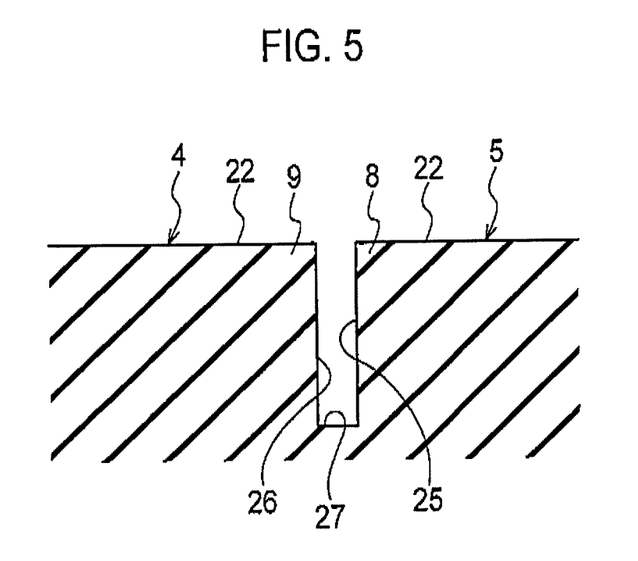
FIG. 5 is an enlarged sectional view taken along the line B-B of FIG. 1.

As shown in FIG. 5, among the inter-block lateral grooves 7, the cross section of the outside lateral groove P is formed in a sectional rectangle shape. Therefore, the outside longitudinal walls 25, 26 which form the tire circumferential ends of the stepping side 8 and the kicking-out side 9 in the land blocks 4, 5 are disposed substantially vertically from the tread surface 22 towards the inside in the tire radial direction, respectively.

Function and Advantageous Effects (1) A inter-block lateral groove 7, which is disposed between a predetermined land block 5 and an adjacent land block 6 which is adjacent to the land block 5 at the circumferential direction side of the land block 5, are comprised of: an inside lateral groove Q which is disposed at the inside in the tire width direction on a boundary of a bent portion 12 which is formed intermediate portion in the tire width direction; and an outside lateral groove P which is disposed at the outside in the tire width direction, and an inside lateral groove angle θ1 relative to the tire circumferential direction of the inside lateral groove Q is set to be smaller than an outside lateral groove angle θ2 relative to the tire circumferential direction of the outside lateral groove P.

In general, as one of indexes showing easiness of frictional wear, frictional wear energy is exemplified. In heel and toe frictional wear, there is a difference in frictional wear energy between a stepping side and a pick-out side in a land block, and it becomes problematic in a case where the frictional wear energy at the kicking-out side is greater than that at the stepping side. Here, it is generally known that frictional wear energy is proportional to a product between a shear force and a slip. Then, at this time, the Inventor of the present invention came up with the idea that components of a shear force mainly acting on heel and toe frictional wear are different from each other between the inside in the tire width direction and the outside in the tire width direction in land block.

That is, as to the heel and toe frictional wear at a portion of the land block of the shoulder portion at the outside in the tire width direction, a main factor is a torsion when a land block is grounded or a shear force in the tire width direction increased by roll-up toward the inside in the width direction received from a tire side portion. As to the heel and toe frictional wear at a inside portion in the tire width direction, a main factor becomes apparent that the shear force in the circumferential direction increased when a widthwise wall extending in the tire width direction, among the walls defining an outer circumference of a land block, falls backward relative to the tire rotation direction.

Therefore, the inside lateral groove angle θ1 relative to the tire circumferential direction of the inside lateral groove Q, among the inter-block lateral grooves 1 defining the widthwise walls of the land blocks 5, 6, is set to be smaller than the outside lateral groove angle θ2 relative to the tire circumferential direction of the outside lateral groove P, whereby shear deformation which may be one of the main factors for heel and toe frictional wear can be restrained irrespective of where the land blocks 5, 6 are positioned.

(2) The inside lateral groove angle θ1 is 30 degrees to 60 degrees, and it is preferable to set the outside lateral groove angle θ2 at 70 degrees to 90 degrees. By setting the inside lateral groove angle θ1 at 30 degrees to 60 degrees, it is possible to restrain the widthwise wall at the inside in the tire width direction of the land block 5 from falling backward relative to the tire rotation direction. On the other hand, by setting the outside lateral groove angle θ2 at 70 degrees to 90 degrees, it is possible to suitably restrain a torsion at the time of grounding at the outside in the tire width direction in the land block 5.

(3) The inside lateral groove Q and the outside lateral groove P are formed smoothly continuously along the tire width direction. Thus, when the land blocks 5, 6 are grounded, deformation never occurs in a one-sided manner at a specific one part of the inter-block lateral groove 7, and an occurrence of abnormal frictional wear can be prevented.

(4) A ratio Wx/W between: a distance Wx taken along the tire width direction from a cross point x between the extension line of the inside lateral groove W and the extension line of the outside lateral groove P up to a tire widthwise inside end 13 of the land block 6; and a total width W taken along the tire width direction of the land block 6 is set at 0.3 to 0.6. Therefore, the land blocks 5, 6 can be set so as not to be too elongated in the tire circumferential direction while the widthwise wall at the inside in the tire width direction of the land block 5 is restrained from falling backward relative to the tire rotation direction, and when the land block 5 is grounded, a torsion at a site at the outside in the width direction can be effectively prevented.

(5) Among the longitudinal walls which form a tire circumferential end of the kicking-out side 9 in the land block 4, the inside longitudinal wall 21 which defines the inside lateral groove Q of the inter-block lateral groove 7 tilts towards the tire rotation direction side as it goes from the tread surface 22 toward the inside in the radial direction. Therefore, since an end part of the kicking-out side 9 in the land block 4 is lower in rigidity than that of the stepping side 8, the frictional wear energy at the kicking-out side 9 is reduced and then heel and toe frictional wear is mitigated.

(6) A circumferential thin groove 10 which extends in the tire circumferential direction is provided at a site at the inside in the tire width direction in the land block 5. Thus, there is an advantageous effect of alleviating deformation of the land block 5, increasing in the tire circumferential direction.

(7) A circumferential thin groove 11 which extends in the tire width direction is provided at a site at the outside in the tire width direction in the land block 5. Therefore, there is an advantageous effect of alleviating deformation of the land block 5, increasing in the circumferential direction.

(8) Frictional wear which may be one of the main causes of an inter-block lateral groove 7 is formed only at a shoulder portion. Thus, the heel and toe frictional wear at a site at the outside in the tire width direction in the land block 5 of the shoulder portion, that is, a torsion exerted when a land block is grounded or a shear force in the tire width direction in which a tread surface after grounded increases roll-up at the inside in the width direction received from a tire side portion can be effectively restrained.

(9) An angle θ3, which is formed by the extension line of an inside lateral groove and an extension line of the outside lateral groove is an obtuse angle. Therefore, a shear deformation which may be one of the main causes of heel and toe frictional wear can be further restrained without lowering rigidity of the land block 5.

Second Embodiment

Next, a second embodiment according to the present invention will be described.

Figure 6:
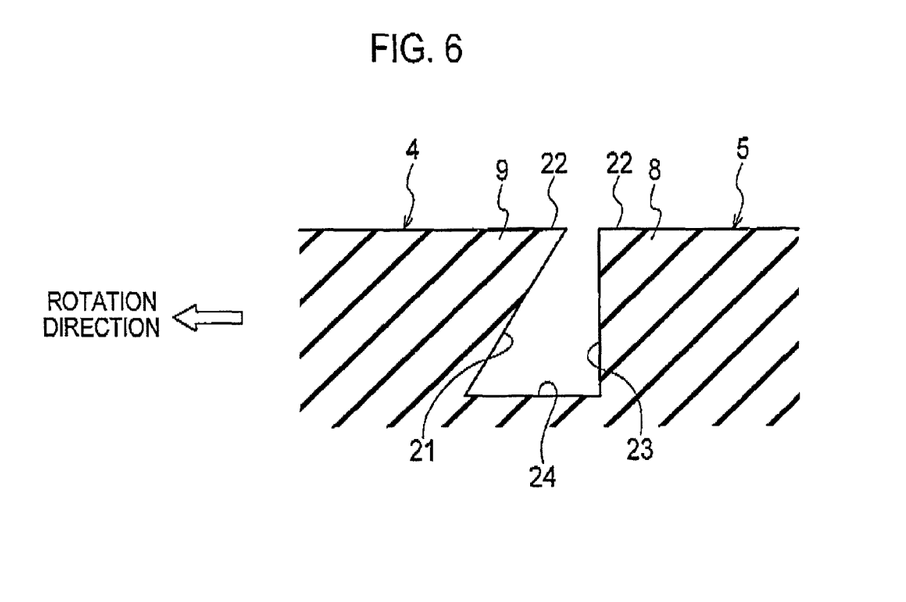
FIG. 6 is a sectional view showing a cross section of an outside lateral groove according to a second embodiment of the present invention.
Figure 7:
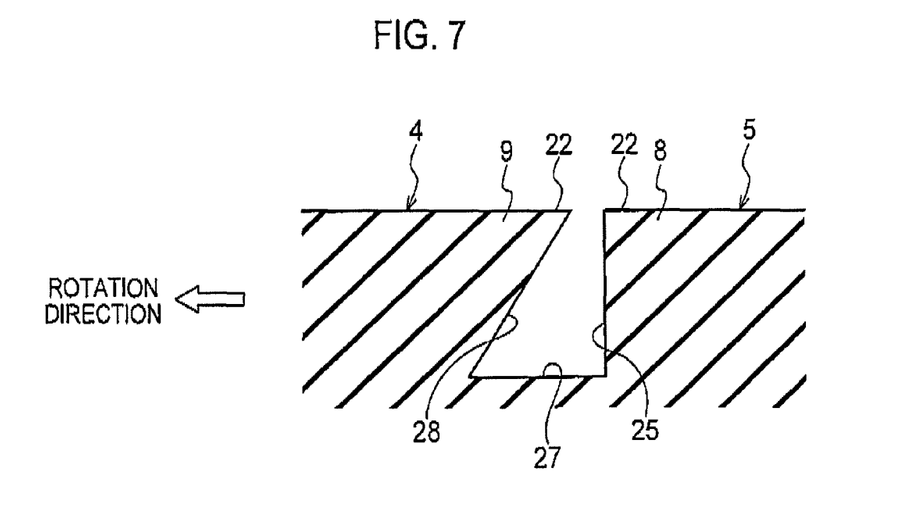
FIG. 7 is a sectional view showing a cross section of an inside lateral groove according to the second embodiment of the present invention.

FIG. 6 is a sectional view showing a cross section of an outside lateral groove according to the second embodiment, and FIG. 7 is a sectional view showing a cross section of an inside lateral groove according to the second embodiment.

In the embodiment, a longitudinal wall, in its entirety, which forms a tire circumferential end of a kicking-out side 9 in a land block 4, tilts towards a rotation direction side of a tire as it goes from a tread surface 22 toward the inside in a tire radial direction.

That is, in the first embodiment described previously, among the longitudinal walls which form the tire circumferential end of the kicking-out side 9 in the land block 4, only an inside longitudinal wall 21 which defines the inside lateral groove Q in the inter-block lateral groove 7 was allowed to tilt towards the rotation direction side of the tire as it goes from the tread surface 22 toward the inside in the tire radial direction. On the other hand, in the embodiment, both of the inside longitudinal wall 21 that defines the inside lateral groove Q in the inter-block lateral groove 7 and the outside longitudinal wall 28 which defines the outside lateral groove P are allowed to tilt towards the rotation direction side of the tire as it goes from the tread surface 22 to the inside in the tire radial direction.

Functions and Advantageous Effects

The entire longitudinal wall that forms the tire circumferential end of the kicking-out side 9 in the land block 4 tilts toward the rotation direction side of the tire as it goes from the tread surface 22 towards the inside in the tire radial direction.

Therefore, there is an advantageous effect that swelling out of the land block 4 is restrained and a shear force in the tire circumferential direction is reduced.

Other Embodiments

As described previously, while the contents of the present invention were disclosed through the embodiments of the present invention, it should not be understood that the discussion and drawings which form a part of this disclosure limit the present invention. From this disclosure, a variety of alternative embodiments, examples, and operational techniques would become self-evident to one skilled in the art.

For example, while, in the embodiments, the circumferential thin groove 10 was formed so as to link the inter-block lateral grooves 7, 7 that are adjacent to each other in the tire circumferential direction, this thin groove may be spaced from the inter-block lateral grooves 7, 7. In addition, while one end of the widthwise thin groove 11 was opened, it may not be opened. Further, a sipe may be formed in place of the circumferential thin groove 10 or the widthwise thin groove 11.

In this way, it is a matter of course that the present invention is inclusive of a variety of embodiments or the like which are not described herein. Therefore, a technical scope of the present invention is defined only by specific matters of the invention according to the claims that are reasonable from the foregoing description.

Next, a description will be furnished as to results of tests which were performed with use of a pneumatic air-containing tire according to the prior art, Comparative Example, and Example of the present invention.

Figure 8:
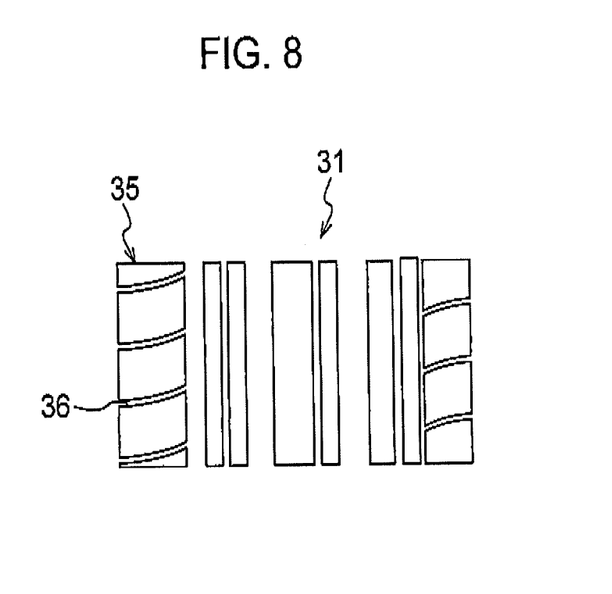
FIG. 8 is a view showing a grounding surface of a pneumatic air-containing tire according to the prior art.
Figure 9:
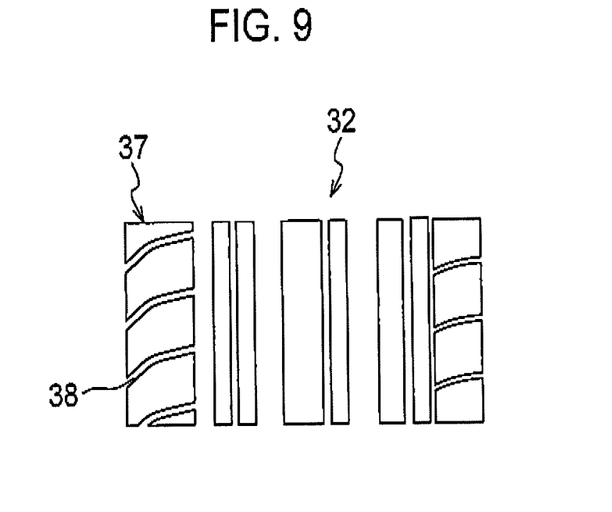
FIG. 9 is a view showing a grounding surface of a pneumatic air-containing the according to Comparative Example.
Figure 10:
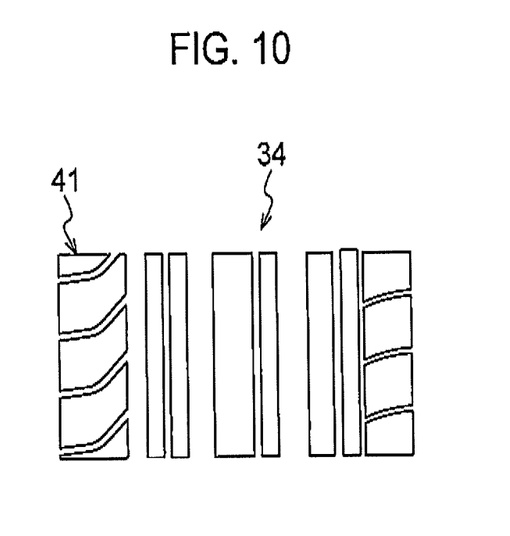
FIG. 10 is a view showing a grounding surface of a pneumatic air-containing tire according to Example of the present invention.

FIG. 8 is a view showing a grounding surface 31 of a pneumatic air-containing tire according to the prior art; FIG. 9 is a view showing a grounding surface 32 of a pneumatic air-containing tire according to Comparative Example; and FIG. 10 is a view showing a grounding surface 34 of a pneumatic air-containing tire according to Example of the present invention.

While, in the grounding surface 31 of the pneumatic air-containing tire shown as the prior art, a lateral groove 36 is formed in a land block 35 arranged at the left end part of the figure, this lateral groove 36 fails to satisfy the requirements of the angles θ1 and θ2 according to the present invention.

While, in the grounding surface 32 of the pneumatic air-containing tire shown as Comparative Example, as to a lateral groove 38 disposed between the 1 and blocks 37, an inside lateral groove angle θ1 is set to be greater than an outside lateral groove angle θ2; and therefore, this lateral groove fails to satisfy the requirements of the angle θ1 and θ2 according to the present invention.

A tire size of a test tire is 225/45R17 90W. A wheel size was set at 5JJ×17 and an internal pressure was set at 220 kPa. The test tire was attached to a front shaft of an FR vehicle, the FR vehicle was allowed to run 10,000 km in field traveling, and thereafter, there was measured the amount of heel and toe frictional wear, which is a difference in height between a stepping side and a kicking-out side, as to two sites, that is, an inside end part and an outside end part in the tire width direction in a land block of a shoulder portion. The heel and toe frictional wear is indicated by a resistive heel and toe index while that of the prior art is defined to be 100. The measurement results are shown in Table 1 below. It is indicated that the smaller the resistive heel and toe index is, the better it is. In addition, an inside lateral groove angle θ1 relative to the tire circumferential direction of an inside lateral groove, an outside lateral groove angle θ2 relative to the tire circumferential direction of an outside lateral groove, and a ratio Wx/W of a width Wx of an inside lateral groove between land blocks were computed.

TABLE 1

| | | Prior Art | Comparative Example | Example |
|---|---|---|---|---|
| Index | Inside in width direction | 100 | 100 | 70 |
| | Outside in width direction | 100 | 160 | 90 |
| θ1 | | 70° | 80° | 45° |
| θ2 | | 85° | 45° | 80° |
| Wx/W | | 0.35 | 0.35 | 0.35 |

As a result, it was found that the amount of heel and toe frictional wear is reduced by about 30% remarkably than that of the prior art at an end part of the inside in the tire width direction and is reduced at 10% more remarkably than that of the prior art at an outside end part in the width direction.

Figure 11:
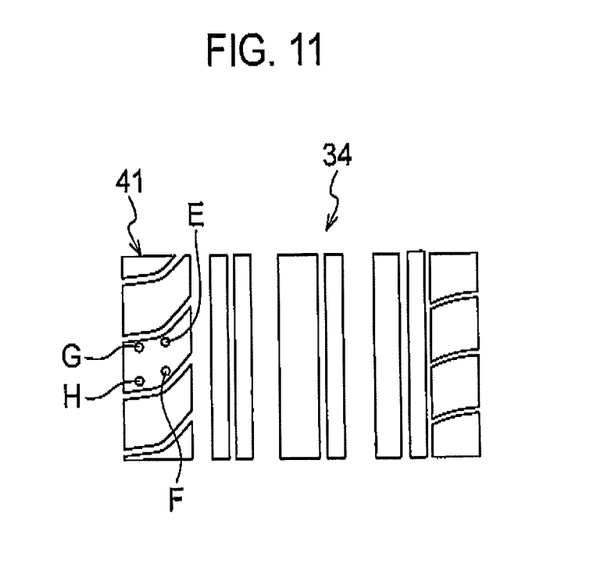
FIG. 11 is a view showing a grounding surface of a pneumatic air-containing tire showing a measurement site of frictional wear energy in the pneumatic air-containing air of the Example.

Next, the frictional wear energy at each site of a land block was measured. The measurement sites are as shown in FIG. 11. As to an inside end part in the width direction in a land block 41, the frictional wear energy at an E site was defined to be EW1, the frictional wear energy at an F site was defined to be EW2, and then, a difference (EW2−EW1) between a stepping side and a kicking-out side, of frictional wear energy, was obtained. In addition, as to an outside end part in the tire width direction, the frictional wear energy at a G site was defined to be EW3, the frictional wear energy at an H site was defined to be EW4, and then, a difference (EW4−EW3) between a stepping side and a kicking-out side, of the frictional wear energy, was obtained. As a result, EW2−EW1 was 10 J/m$^2$, and EW4−EW3 was 15 J/m$^2$. These values are represented by indexes while a reference of the prior art was defined to be 100, and it is meant that the smaller the values of the indexes are, the higher the resistive heel and toe frictional wear property is.

In this manner, according to the present invention, it was found that the heel and toe frictional wear at both of an inside end part and an outside end part in the tire width direction of a land block can be effectively restrained.

The entire contents of Japanese Patent Application No. 2008-271133 (which was filed on Oct. 21, 2008) are incorporated in the specification of the present application by reference.

INDUSTRIAL APPLICABILITY

As described hereinbefore, as the tire according to the present invention, there can be provided a tire of effectively restraining heel and toe frictional wear at both sides, at the outside in the tire width direction and at the inside in the tire width direction in a land block of a shoulder portion.

The invention claimed is:

1. A tire in which a plurality of land blocks are formed by a circumferential groove which extends in a tire circumferential direction and a lateral groove which extends in a tire width direction, and formed on at least one of a tread portion and a shoulder portion, wherein
an inter-block lateral groove is disposed between a predetermined land block and an adjacent land block which is adjacent to the predetermined land block at a tire circumferential direction side of the predetermined land block, among the plurality of the land blocks, and is formed of an inside lateral groove and an outside lateral groove, the inside lateral groove being disposed at an inside of a boundary of a bent portion in a tire width direction, the outside lateral groove being disposed at an outside of the bent portion, the bent portion being formed at intermediate portion in the tire width direction,
an inside lateral groove angle θ1 relative to the tire circumferential direction of the inside lateral groove is smaller than an outside lateral groove angle θ2 relative to the tire circumferential direction of the outside lateral groove,
the inside lateral groove angle θ1 is 30 degrees to 60 degrees and the outside lateral groove angle θ2 is 70 degrees to 80 degrees, and
the predetermined land block and the adjacent land block are provided at the shoulder portion and the inter-block lateral groove is provided at the shoulder portion.

2. The tire according to claim 1, wherein
the inside lateral groove and the outside lateral groove are formed smoothly and continuously along the tire width direction.

3. The tire according to claim 1, wherein
a ratio Wx/W between a distance Wx and a total width W is 0.3 to 0.6, the distance Wx being a distance in the tire width direction from a tire width direction inside end of the land block to a cross point x where an extension line of the inside lateral groove crosses an extension line of the outside lateral groove, the total width W in the tire width direction of the land block.

4. The tire according to claim 1, wherein
an inside longitudinal wall defining the inside lateral groove of the inter-block lateral groove is included in a longitudinal wall forming a tire circumferential end at a kicking-out side in the land block, and the inside longitudinal wall tilts toward a rotation direction side of the tire, as the inside
longitudinal wall becomes inside in a tire radial direction from a tread surface.

5. The tire according to claim 1, wherein
a longitudinal wall forming a tire circumferential end at a kicking-out side in the land block entirely tilts toward a rotation direction side of the tire, as the inside longitudinal wall becomes inside in a tire radial direction from a tread surface.

6. The tire according to claim 1, wherein
a circumferential thin groove extending in the tire circumferential direction is formed at an inside portion of the land block in the tire width direction.

7. The tire according to claim 1, wherein
a widthwise thin groove extending in the tire width direction is formed at an outside portion of the land block in the tire width direction.

8. The tire according to claim 1, wherein
an angle θ3 formed by the extension line of the inside lateral groove and
the extension line of the outside lateral groove is an obtuse angle.

* * * * *